(No Model.)
E. F. OSBORNE.
STEAM TRAP.
No. 248,877. Patented Nov. 1, 1881.
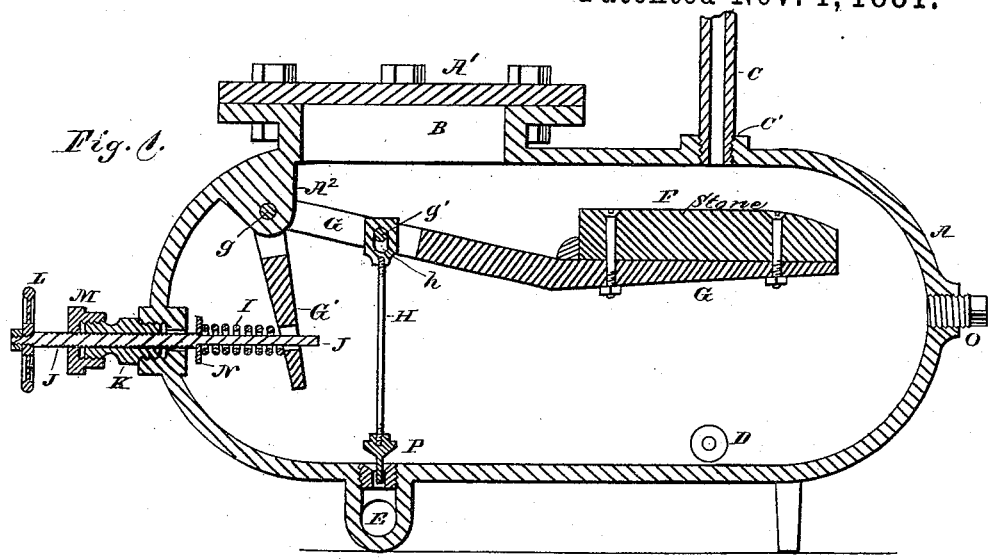
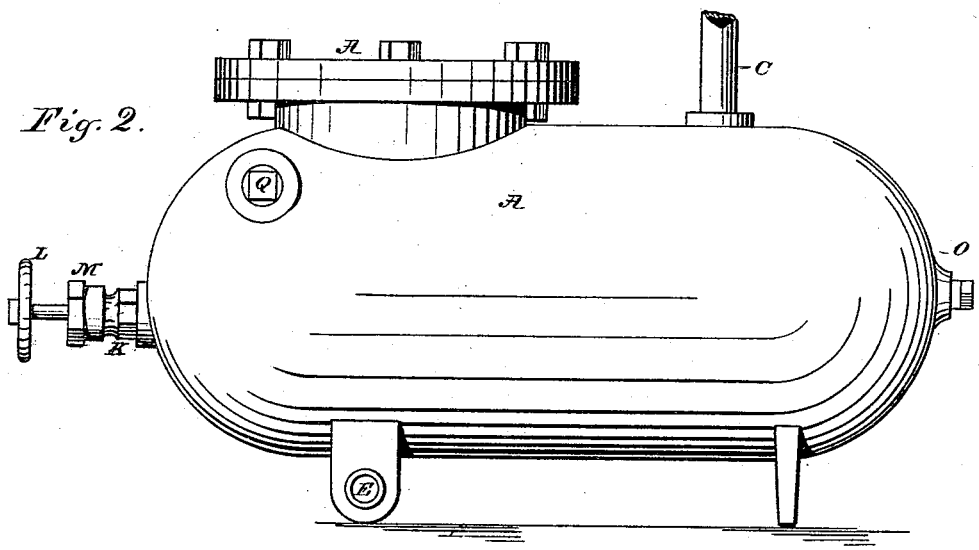
WITNESSES
F. B. Townsend
W. C. Adams
INVENTOR
Eugene F. Osborne
per W. C. Dayton
Attorney (No Model.)

E. F. OSBORNE.
STEAM TRAP.

No. 248,877.             Patented Nov. 1, 1881.

WITNESSES
F. B. Townsend
W. D. Adams

INVENTOR
Eugene F. Osborne
per W. C. Dayton
Attorney (No Model.)

E. F. OSBORNE.
STEAM TRAP.

No. 248,877.

3 Sheets—Sheet 3.

Patented Nov. 1, 1881.

Attest:
J. C. Turner
R. D. O. Smith

Inventor:
Eugene F. Osborne
per M. E. Dayton
Attorney

UNITED STATES PATENT OFFICE.

EUGENE F. OSBORNE, OF ST. PAUL, MINNESOTA.

STEAM-TRAP.

SPECIFICATION forming part of Letters Patent No. 248,877, dated November 1, 1881.

Application filed January 31, 1881. (No model.)

*To all whom it may concern:*

Be it known that I, EUGENE F. OSBORNE, of St. Paul, in the county of Ramsey and State of Minnesota, have invented certain new and useful Improvements in Steam-Traps; and I do hereby declare that the following is a full, clear, and exact description thereof, reference being had to the accompanying drawings, and to the letters of reference marked thereon, which form a part of this specification.

My invention has for its object to provide an improved float steam-trap for the "equalized" or "balanced" pressure system of steam-heating set forth in Letters Patent No. 212,320, granted to me February 18, 1879, and is an improvement for this purpose upon a well-known class of traps heretofore in use, by which the same is adapted to this form of heating apparatus.

The invention relates to structural features in the trap, having reference to this adaptation, and also to mechanism having reference to adjustment and operation of the float.

The invention consists, primarily, in the combination of the trap described with the return, the discharge, and the equalizing pipes of the equalized-pressure system mentioned.

As to mechanism in the trap itself, the invention consists in the combination, with the float-lever which operates the discharge-valve, of a spring arranged to bear on said lever and made adjustable from the exterior of the trap, whereby the elevation of the water-level may be regulated at will.

It also consists in other features of construction that will, with the foregoing, be hereinafter more fully set forth, and pointed out in the claims.

Figure 3:
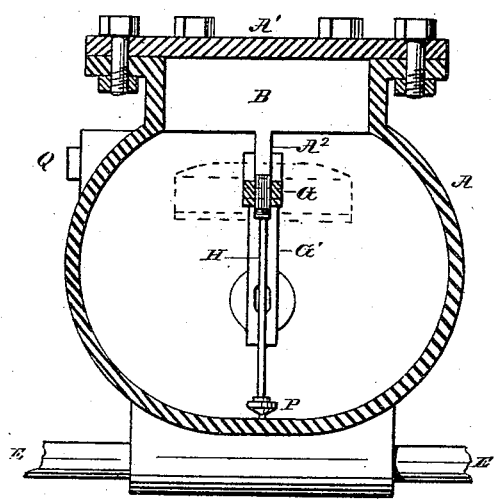
Figure 5:
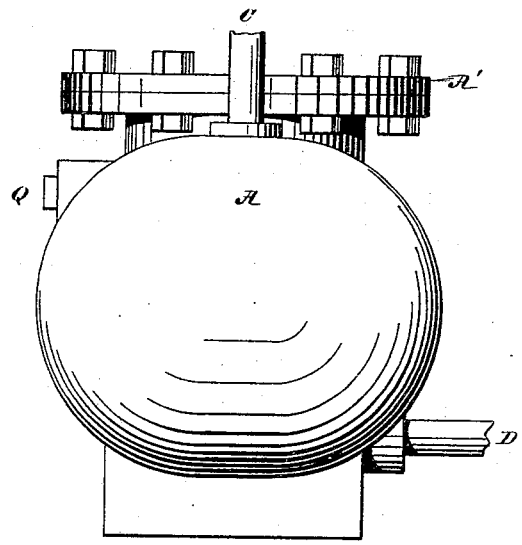
Figure 4:
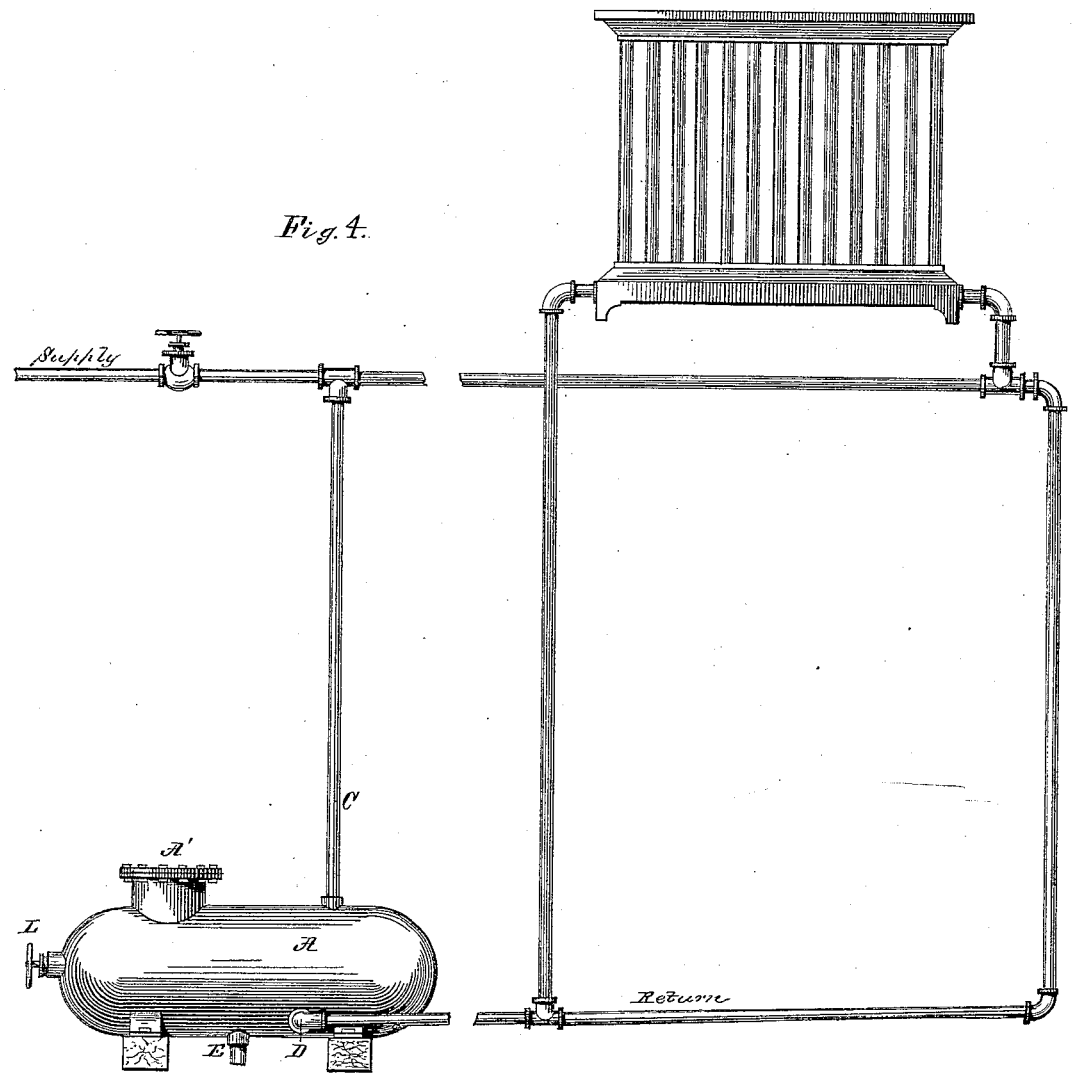

In the drawings, Figure 1 is a longitudinal central vertical section of the trap. Fig. 2 is a side elevation. Fig. 3 is a transverse vertical section through 1 1 of Figs. 1 and 2, looking toward the left in those figures; and Fig. 4 illustrates the elements of the system of piping which forms the subject of the former patent referred to, showing the trap herein described connected therewith. Fig. 5 is an end view of the trap.

The same letter indicates the same part in all figures of the drawings.

A is an oblong hollow cylindric casting, having hemispheric ends, forming, with the hand-hole cover A', the shell of the trap.

B is the hand-hole, made of sufficient size for the insertion and proper connection of the float, and arranged near one end of the shell, so as to bring the several joints and mechanical parts there located within the shell into plain view or easy reach when the lid A' is removed.

C is the equalizing-pipe peculiar to the heating apparatus above referred to as patented to me, reference being here made to said patent for a full explanation of said system. For the purposes of this patent it is sufficient to say that the pipe C connects the steam-supply main at the head of the heating system directly with the tank or trap A, which receives the condense-water discharge from the system, and thereby equalizes the pressure at both ends of the circuit, with advantages fully set forth in said patent and not now necessary to mention.

E is the valved outlet.

P is the valve controlling the outlet E.

F is the float, of stone, plaster-of-paris, or other suitable material.

G is the float and valve lever, slotted to embrace the lug $A^2$, to which it is pivoted at $g$.

H is the valve-rod, which also enters the slot in lever G, and which has the slot $h$ at its upper end, through which the pin $g'$ passes, connecting said rod with the lever G.

P is the valve, operated by the rod H and lever G to control the outlet E.

G' is a vertical short arm of the lever G, depending near the end of the shell A.

I is a spring, inserted behind the arm G' in manner to bear inwardly thereon, and to thereby assist in supporting the float F, or, in other words, to serve as a variable counterpoise to said float. The tension of the spring I is made variable by means of the screw-rod J, provided with a suitable shoulder, N, against which the spring I bears. Said screw-rod is fitted to run in the shell, or preferably in the removable nipple K, and is externally provided with the hand-wheel L, by which it is conveniently operated. The nipple K is threaded into the shell and bears against a suitable packing. It is also provided at its outer end with a screw-cap, M, which incloses a packing.

O is an overflow-outlet, intended for optional use when the pressure from inlet and outlet is nearly or exactly balanced.

Q is a plugged opening opposite the pivotal point of the lever G, and through which the ear $A^2$, to which said lever is pivoted, may be drilled to receive the pivot-pin $g$. Said opening is available as an inlet for the trap when the latter is employed in ordinary steam-connections.

In the use of the spring-counterpoise here shown the float is set with the trap empty by running in the screw-rod J until the pin $g'$ is just lifted off the bottom of the slot $h$.

By reference to my aforesaid Letters Patent it will be understood that it may be sometimes desirable to vary the level of water in the trap. By lessening the tension on the spring I the water-level will obviously be raised, and vice versa. For the purpose of effecting this variation of level the spring-counterpoise has obvious advantages over the partially and variably submerged counterpoise heretofore used.

Instead of the spiral, I prefer a flat spring arranged to bear on the short arm $G'$ of the lever G, and, if desired, the rod J may be arranged to work vertically, either by constructing the lever G G' with both its arms horizontal, or by employing a bent flat spring in connection with the bent form of lever here shown.

In constructing the shell A in a single piece the opening C' for the equalizing-connection C, which is preferably located at the very top of the trap, is of material advantage. By making the core for the mold with the projection necessary to give this opening, and also of form to make the broader opening, B, for a hand-hole, the core is fitted to stand in proper place in the mold by resting it on these projections, casting the shell bottom up; but whether so cast or not, the trap, having its shell in a single piece and with only the small extent of packing required about the hand-hole, is far more securely closed and less liable to leak than when divided, as heretofore, along its entire length. The ovoid form of the shell A obviously gives the utmost strength attainable.

I claim as my invention—

1. The combination, with the return-pipe, the discharge-pipe, and the equalizing-pipe of an equalized-pressure system of steam-heating, of the trap described, having the hand-hole B, the opening C', located at the top of the trap, for the reception of the equalizing-pipe, the opening D at the bottom, for the reception of the return-pipe, the bottom discharge-opening, E, the float F, and valve P, controlling the opening E, and means for adjusting the float from the exterior of the trap, substantially as described.

2. In a trap adapted by the presence and arrangement of the several openings, as described, to be connected into the equalized-pressure system of steam-piping, as set forth, the combination, with such several openings, of the valve-operating float F, the interior spring, I, and the adjusting screw-rod J, passing through the shell of the trap and operable to adjust the spring and float from the exterior of the trap, substantially as described.

In testimony that I claim the foregoing as my invention I affix my signature in presence of two witnesses.

EUGENE F. OSBORNE.

Witnesses:
  M. E. DAYTON,
  JESSE COX, Jr.